US012422067B1

(12) United States Patent
Gulyansky et al.

(10) Patent No.: US 12,422,067 B1
(45) Date of Patent: Sep. 23, 2025

(54) METHODS STRUCTURES DEVICES ASSEMBLIES SYSTEMS AND FUNCTIONALLY ASSOCIATED MACHINE EXECUTABLE INSTRUCTIONS FOR INDUSTRIAL PROCESSING OF MATERIAL

(71) Applicants: Michael Gulyansky, Jurmala (LV); Alexander Samoilov, Moscow (RU)

(72) Inventors: Michael Gulyansky, Jurmala (LV); Alexander Samoilov, Moscow (RU)

( * ) Notice: Subject to any disclaimer, the term of this patent is extended or adjusted under 35 U.S.C. 154(b) by 0 days.

(21) Appl. No.: 18/362,808

(22) Filed: Jul. 31, 2023

(51) Int. Cl.
*F16L 23/02* (2006.01)
*F16L 23/00* (2006.01)
*F16L 23/22* (2006.01)

(52) U.S. Cl.
CPC ............ *F16L 23/02* (2013.01); *F16L 23/006* (2013.01); *F16L 23/22* (2013.01)

(58) Field of Classification Search
CPC ......... F16L 23/02; F16L 23/006; F16L 23/16; F16L 23/22; F16L 53/00; F16L 53/30; F16L 53/32; F16L 53/70
See application file for complete search history.

(56) References Cited

U.S. PATENT DOCUMENTS

| | | | | |
|---|---|---|---|---|
| 4,288,105 A * | 9/1981 | Press | .................. | F16L 23/02 285/55 |
| 5,277,455 A * | 1/1994 | Graves | .................. | F16L 23/16 285/55 |
| 5,407,214 A * | 4/1995 | Lew | .................. | F16L 23/16 277/933 |
| 5,518,257 A * | 5/1996 | Breaker | .................. | F16L 23/16 277/627 |
| 6,267,414 B1 * | 7/2001 | Mosse | .................. | F16L 23/16 285/24 |
| 6,402,159 B1 * | 6/2002 | Kohn | .................. | F16L 23/16 277/611 |
| 10,393,302 B2 * | 8/2019 | Dill | .................. | F16L 23/16 |
| 2017/0198639 A1 * | 7/2017 | Zabinski | .................. | F16L 23/006 |

FOREIGN PATENT DOCUMENTS

| | | | | |
|---|---|---|---|---|
| CN | 203847862 U | * | 9/2014 | ............ F16L 23/02 |
| CN | 206468812 U | * | 9/2017 | ............ F16L 23/02 |
| CN | 113266717 A | * | 8/2021 | ............ F16L 23/02 |
| DE | 20314744 U1 | * | 2/2005 | ............ F16L 23/22 |
| DE | 102014100155 A1 | * | 7/2015 | ............ F16L 23/02 |
| EP | 2194305 A1 | * | 6/2010 | ............ F16L 23/02 |
| KR | 200416929 Y1 | * | 5/2006 | ............ F16L 23/02 |
| KR | 101304551 B1 | * | 9/2013 | ............ F16L 23/02 |
| WO | WO-9900620 A1 | * | 1/1999 | ............ F16L 23/02 |

* cited by examiner

*Primary Examiner* — Amber R Anderson
*Assistant Examiner* — Fannie Kee

(57) ABSTRACT

Methods, structures, devices, systems and functionally associated machine executable instructions for industrial material processing. There may be provided flange structures and flange assemblies for interconnecting pipes carrying a working fluid across the interconnection. The flange assemblies may include first and second flange structures fastened to one another along respective flange structure interface surfaces and in alignment of respective flange structure pipe openings, wherein each of said flange structures includes a body portion with at least one heat transfer material channel disposed upon or within said body portion.

19 Claims, 5 Drawing Sheets

METHODS STRUCTURES DEVICES ASSEMBLIES SYSTEMS AND FUNCTIONALLY ASSOCIATED MACHINE EXECUTABLE INSTRUCTIONS FOR INDUSTRIAL PROCESSING OF MATERIAL

FIELD OF THE INVENTION

The present invention relates generally to the field of industrial processing. More specifically, the present invention relates to methods, structures, devices, assemblies, systems and functionally associated machine executable code for industrial processing of materials.

BACKGROUND

In many industries, fluids are conveyed through piping systems from one location to another. In order to connect piping sections together, flange assemblies are commonly used. These assemblies consist of two flanges or flange structures that are fastened together, sometimes with a gasket or some fluid seal between them to provide a leak-tight seal.

However, problems can arise when the working fluid conveyed through the piping system is at a temperature that is outside the operating temperature of the material with which the gasket and/or seal is composed. The temperature of the working fluid passing through the pipes interconnected by the flange assembly may sometimes increase the gasket/sealing material's temperature beyond operating its temperature range. Additionally, there may be problems caused by the release of heat in the flanges or flange structures under the influence of an alternating magnetic field. Conversely, the working fluid temperature may decrease the temperature of the gasket/sealing material to a temperature below the material's operating range. According to both scenarios, the instantaneous functionality of the material may be compromised. The useful lifetime of the material, before the material's required replacement, may also be reduced by each out of range temperature event described above.

Additionally, issues arise when the gasket or seal material provides electrical isolation between flange structures of a flange assembly. The temperature of each flange structure can alter the electrical properties, including resistivity and breakdown voltage, of the materials used in the flange assembly. This can degrade the electrical isolation material's operational effectiveness, immediate and long term, leading to safety concerns and increased maintenance costs.

Flanged connections or interconnections made through flange assemblies are known. Examples of such assemblies can be found in the catalogs of companies including Seaco Group BV. Seaco provides assemblies with seals of a dielectric sealing material between the flanges and with fasteners electrically isolated from the flanges. Flanged connections of Seaco are known to use dielectric type seal made of material produced by Ningbo Sunwell Sealing Materials Co., Ltd., which dielectric sealing material is placed between the flanges, electrically isolating each of the flange structures from each other and from fasteners which hold the flanged connection or assembly together.

There is a need in the field material processing for advancements in structural design and component selection for improved flange connections or assemblies capable of operating and enduring extreme temperatures and or extreme temperature fluctuations of working fluids passing through pipes or conduits interconnected through the flange connections/assemblies and/or significant heat release in the materials of flanges or flange structures under the influence of an alternating magnetic field.

SUMMARY OF THE INVENTION

Embodiments of the present invention include innovations to overcome the technological challenges and drawbacks presented above, amongst others. Included within these innovations may be assembly arrangements, structures, materials and systems for regulating temperature of flanged connections and elements associated therewith. Flange assemblies, comprised of flange structures aligned and interconnected with one another using fasteners may be cooled by introducing using a coolant passing through channels located across the flange structures and inside the fasteners.

Embodiments of the present invention may also include methods, materials, devices and systems to regulate the temperature of materials used to seal the flanged connections. Embodiments of the present invention may also include methods, materials, devices and systems to regulate the temperature of materials used to electrically isolate each of the flange structures from one another. Embodiments of the present invention may also include methods, materials, devices and systems to regulate the temperature of materials used to electrically isolate each of the flange structures from one or more fasteners used to urge and hold the flange structures together as an assembly.

Embodiments of the present invention include methods, structures, devices, assemblies, systems and functionally associated machine executable code for industrial processing of materials. According to some embodiments of the present invention, there may be provided flange structures and flanged connections with temperature control elements facilitating temperature control of the flanges and or of the flanged connection.

Using either heating or cooling elements and features which may be integral or otherwise functionally associated with the flange or with a flange connection, temperature of the flange and or flange connection may be regulated and maintained within a specific temperature range. According to further examples the selected temperature range may be, for example, a temperature range required to ensure that functionally associated seals or sealants, made of specific sealant or sealing materials, are kept within a safe operating temperature irrespective of the temperature of working fluid being carried through the flanged connection.

According to further embodiments, a seal or sealant whose temperature may be regulated may electrically isolate the flange structures of a flanged connection or interconnect structures from one another. According to further embodiments, a seal or sealant placed between to interconnected flanges, whose temperature is regulated, may also electrically isolate the fasteners used to urge and fasten the flanged connection together, from the flanges of the flanged connection. The sealant may be composed of a variety of materials, mixtures, and compositions of matter which may have at least some of the following properties: (1) electrically insulative; (2) electrically dielectric; (3) mechanically strong; (4) chemically non-reactive and durable.

The material compositions and shapes used for sealing space between two interconnected flanges and electrically isolating the two flanges from one another can be selected from a list of commercially available materials including silicones, ceramics and polymers, multiple material may be mixed, mechanically interconnected or chemically reacted/ bonded to produce the desired sealing and isolation material. The isolating material may be placed between the interface surfaces as a single piece gasket or as a set of overlayed gaskets or as a set of gaskets placed adjacent to one another along the interface surface. Any electrically insulating material known today or to be devised in the future with the capacity to seal spaces between two ends of an interconnected flange assembly while electrically isolating the two flanges from one another may be suitable to embodiments of the present invention.

The present invention provides a flange assembly for interconnecting pipes carrying a working fluid across the interconnection. The flange assembly comprises first and second flange structures fastened to one another along respective flange structure interface surfaces and in alignment of respective flange structure pipe openings.

Pipes according to embodiments of the present invention may include a thermal lining layer on the inside of pipes. This pipe lining material may have a high heat gradient and may provide a barrier to heat transfer from the working fluid to the flanged pipes and to the sealing/isolating material. The pipe lining may be made of various materials such as refractory (or fire-resistant) materials like $SiO_2$, anions $AlSi_3O_4(-1)$, $AlSi_4O_{10}(-2)$, $Al_2O_3$, $SiC$, $MgCO_3$ etc.

Each of the flange structures may include a body portion with at least one heat transfer material channel disposed upon or within the body portion. The flange assembly may also include an electrical insulating material disposed between the interface surfaces of the first and second flange structures, thereby electrically isolating the first and second flanges structures from one another. As mentioned previously, the electrically insulating material may also act as a sealant of the space between the two flanges.

According to further embodiments, the flange assembly may further comprise electrical isolation material disposed upon fastener engagement features or surfaces of the first and second flange structures, which fastener engagement features are configured to be engaged by a fastening element. At least one fastener may be used to fasten the first and second flange structures to one another by engaging electrical isolation material covered fastening features on each of the first and second flange structures. Since the fastener's contact points on both the first and second flanges are within the electrically insulated areas of the two flanges, the fasteners should not provide electric current conduction between the two flanges.

According to embodiments of the present invention, the flange structures and or the fasteners are composed of a metallic material or alloy with a relative magnetic permeability of no more than 10 u.

The heat transfer material channels in each of the first and second flanges may pass heat transfer material, possibly a heat transfer fluid, which either cools or heats the respective flange structure within which the heat transfer material channel is disposed. The heat transfer material channels and heat transfer material may be configured to maintain an operative temperature range in the electrical isolating materials while working fluid passing through the pipes interconnected by said assembly is at a temperature outside the operative temperature range of the isolation material and/or in the flange material.

According to some embodiments, at least some flange structure may be functionally associated (e.g. thermally coupled) with one or more electrically readable temperature sensors which generate electrical signals indicating an estimated temperature of at least a portion the at least one flange structure. A working fluid temperature sensor may be thermally coupled with the pipes and configured to generate an electrical signal indicating an estimated temperature of the working fluid flowing through the pipes.

As part of a system solution for management of flange interconnection temperature, a functionally associated temperature controller may be provided to regulate a temperature and flowrate of heat transfer material passing through one or more given channels associated with one or more given flange structures. Target heat transfer material temperatures and flowrates for each give flange structure may be at least partially calculated based on electrical signals generated by the temperature sensor functionally associated with the given flange structure. The temperature controller may be further configured to calculate target heat transfer material temperatures and flowrates at least partially based on electrical signals generated by the working fluid temperature sensor.

A temperature and flowrate for each flange structure of said flange assembly may be individually regulated. Target temperature and flowrate for heat transfer material passing through the channels each of the flange structures may be calculated by a temperature controller as a function of temperature values contained in signal from associated sensor and a thermal distribution model of the flange assembly. According to further embodiments of the present invention, the temperature controller may also electrically regulate thermal exchange (i.e. heating and or cooling) elements thermally coupled to a reservoir or pathway of the heat exchange material used to regulate flange structure temperature. The temperature controller may also be functionally associated with movers of heat transfer material, such as pumps, and valves which physically control the transfer of temperature regulated heat exchanger material into respective flange channels. Sometimes the movers and valves are connected to respective channels through pipes or tubes connecting the movers and or valves to respective inlets of target channels.

An example of the operation of a flange assembly with a heat controller or control system, according to embodiments of the present invention, would pump a cooled heat transfer material into channels of flange structures of a flange assembly when temperature sensors functionally associated with the flange structure and or flange assembly with related pipes is indicating increasing temperature of fangle structure such that a sealing and or electrical isolating material is at risk of malfunction and or damage due to the excessive temperature. Conversely, upon signals from functionally associated temperatures indicating a decrease in temperature of a flange structure such that a sealing or electrical isolation material is at risk of malfunction and or damage due to freezing. Specific target temperatures and flow rates of the pumped heat transfer material may be estimated using some or all of the following: (1) specific mathematical models characterizing the heat transfer characteristics of the flange assembly, (2) along with the associated pipes, while factoring the (3) temperature sensor outputs, (4) the heat transfer characteristics of the working fluid carried in the interconnected pipes, and (5) characteristics of the heat transfer material passing through the flange structure channels.

Embodiments of flange assemblies and or connections according to embodiments of the present invention may be characterized in that the dielectric seal is made in the form of a one-piece annular gasket of various cross-sections, performing both the function of a dielectric separator and the function of a seal.

Embodiments of flange assemblies and or connections according to embodiments of the present invention may be characterized in that the dielectric seal is made of a composite, part of which is made of a material or materials having or, respectively, having sufficient rigidity and strength, high electrical resistance, high breakdown voltage to provide an insulating gap ensuring the absence of electrical connection between the flanges when tightening the flange connection with fasteners, and the other part or the parts are made or, respectively, made of a material or materials that perform or, respectively, perform the function of sealing and, if necessary, the third part or parts that perform or, respectively, perform the function of protection from the effects of harmful factors from the working fluid and/or insulating layer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
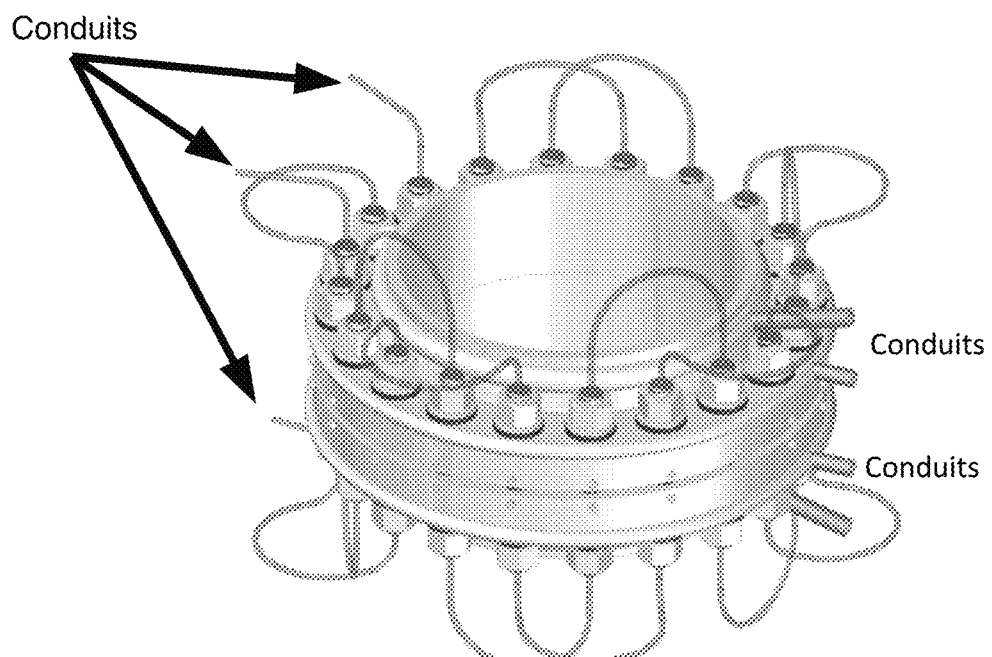
FIG. 1A is a prospective view rendering of an exemplary flange assembly in accordance with embodiments of the present invention wherein two flange structures are fastened to one another with their respective working fluid pipes aligned and including heat transfer material channels entering and exiting each of the flange structures and all of the fasteners.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention aims to create a flange connection with a dielectric seal between the flanges, electrically isolating the fasteners from the flanges, and providing isolation of the working fluid from the surrounding environment. The flange connection is designed for cases where the working fluid temperature differs from the temperature range that ensures the functionality of the sealing and dielectric materials and/or for cases when a significant amount of heat is released in the materials of flanges or flange structures under the influence of an alternating magnetic field.

The technical result of the invention involves heating or cooling the flanges and fasteners to control the temperature of the dielectric seal and electrically insulate or isolate the fasteners, ensuring the functionality of the sealing and insulating materials during the transmission of the working fluid with a temperature outside the specified range. This is effectively achieved by utilizing a coolant that is delivered inside the body of the flanges and fasteners, although external coolant delivery is also possible.

Optionally, the first and second flange structures may be fastened to one another along respective flange structure interface surfaces and in alignment of respective flange structure pipe openings, wherein each of said flange structures includes a body portion with at least one heat transfer material channel disposed upon or within said body portion. For example, the flange structures may be made of steel and the heat transfer material channel may be formed by machining or casting grooves into the body of each flange.

Optionally, the flange assembly may include an electrical isolation material disposed between the interface surfaces of the first and second flange structures and electrically isolating the first and second flanges structures from one another. For example, the electrical isolation material may be made of a high-performance polymer material such as polytetrafluoroethylene (PTFE) or polyether ether ketone (PEEK))) or fiberglass composite type G10 or similar.

Optionally, the flange assembly may further comprise electrical isolation material disposed upon fastener engagement features of the first and second flange structures, which fastener engagement features are configured to be engaged by a fastening element. For example, the electrical isolation material may be in the form of a washer or coating applied to the fastener engagement features.

Optionally, the flange assembly may comprise at least one fastener to fasten said first and second flange structures to one another by engaging electrical isolation material covered fastening features on each of said first and second flange structures. For example, the fastener may be a bolt or stud made of steel, and the electrical isolation material may be a coating of PTFE or another high-performance polymer.

Optionally, the heat transfer material channels in each of the first flange and second flanges may pass heat transfer material which either cools or heats the respective flange structure within which the heat transfer material channel is disposed. For example, the heat transfer material may be a liquid or gas that is circulated through the channels to maintain a desired temperature range.

Optionally, the heat transfer material channels and heat transfer material may be configured to maintain an operative temperature range in the electrical isolating materials while the working fluid passing through the pipes interconnected by said assembly is at a temperature outside the operative temperature range of the isolation material. For example, the heat transfer material may be cooled or heated to maintain the electrical isolation material at a desired temperature range.

Optionally, at least some flange structure may be functionally associated with an electrically readable temperature sensor which generates an electrical signal indicating an estimated temperature of the at least one flange structure. For example, the temperature sensor may be a thermocouple or resistance temperature detector (RTD) embedded within the flange structure.

Optionally, the flange assembly may further comprise a working fluid temperature sensor thermally coupled with the pipes and configured to generate an electrical signal indicating an estimated temperature of the working fluid flowing through the pipes. For example, the working fluid temperature sensor may be a thermocouple or RTD mounted on the outside of the pipe.

Optionally, the flange assembly may further comprise a temperature controller to regulate a temperature and flowrate of heat transfer material pumped into a given channel associated with a given flange structure, wherein the heat transfer material temperature and flowrate are at least partially calculated based on electrical signals generated by the temperature sensor functionally associated with the given flange structure. For example, the temperature controller may be a microprocessor-based controller that receives signals from the temperature sensors and adjusts the flow of heat transfer material accordingly.

Optionally, the temperature controller may be further configured to calculate the heat transfer material temperature and flowrate at least partially based on the sensor generated electrical signals.

Turning now to FIG. 1A, there is shown a prospective view rendering of an exemplary flange assembly in accordance with embodiments of the present invention wherein two flange structures are fastened to one another with their respective working fluid pipes aligned. Between contact surfaces of the flange structures is disposed a layer of isolation material which provides electrical current isolation or separation between the flange structures. The flange structures have disposed therein heat transfer material channels entering and exiting each of the flange structures, which channels enable and guide heat transfer material to pass through respective flange structures.

Flange assemblies in accordance with FIG. 1A may include annular inlets and channels for the heat transfer material or coolant which act as input/output collectors for the rest of the channels in the flanges are annular channels. The fasteners of FIG. 1A also include heat transfer material channels into which tubes carrying the material are shown.

In assemblies exemplified by the one illustrated in FIG. 1A, each fastener, comprised of a nut and bolt pair, urges and holds the two flange structures together into an assembly. The fasteners are also electrically isolated or decoupled from each of the flanges by electrical isolation material covering contact areas between each flange structure and their respective fasteners.

Figure 1B:
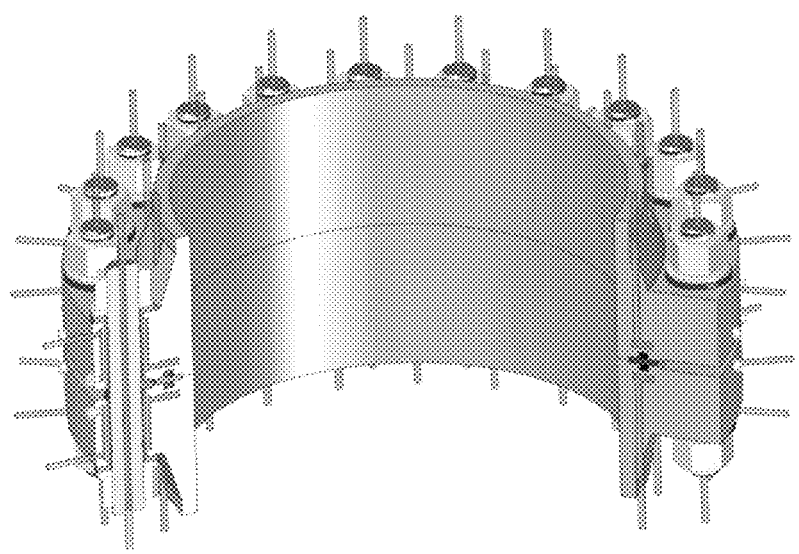
FIG. 1B is a rendering of a version of the flange in the rendering of FIG. 1A, which rendering includes a cutaway of a forward or upward facing portion of the flange assembly, wherein some of the heat transfer material channels passing through the fastening elements are clearly visible.

FIG. 1B shows a modified version of the assembly rendering of FIG. 1A with a cutaway of a portion of the flange assembly, exposing and making visible paths of some of the heat transfer material channels.

Figure 2A:
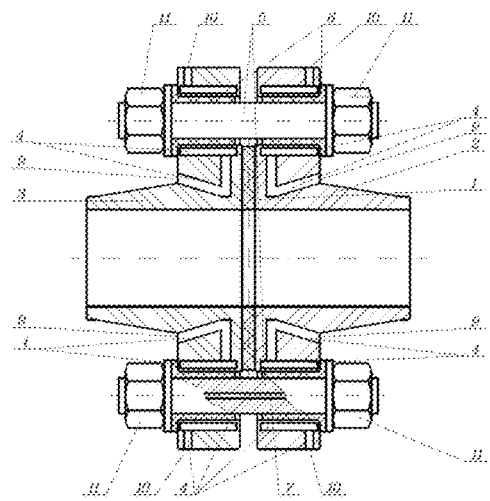
FIG. 2A illustrates a cross-sectional cutaway view of a flange assembly according to embodiments of the present invention where the assembly is held together by fasteners composed of bolts, nuts and washers and the flange structures include a set of channels for carrying heat transfer materials.
Figure 2B:
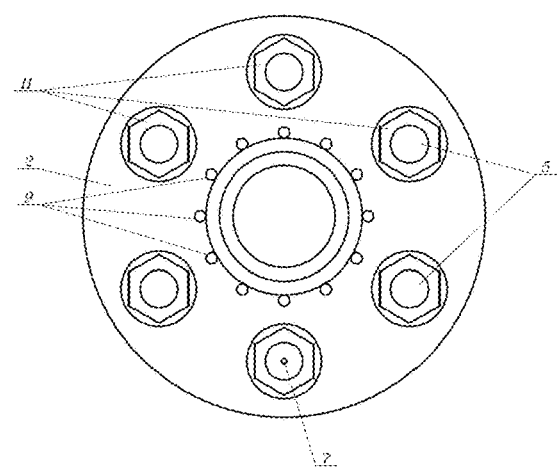
FIG. 2B is a side view of the flange assembly of FIG. 2A, wherein inlets and outlets of the channels can be seen concentrically positioned around the center of the assembly.

Turning now to illustrations of FIGS. 2A through 6, each of the figures illustrate either a "cross sectional cutaway" or a "side" view of slightly different exemplary embodiments of flange assemblies according to embodiments of the present invention. More specifically, FIG. 2A shows a diagram of a flange assembly/connection with a dielectric seal between the flanges, while FIG. 2B shows the side view of the flange assembly/connection.

Figure 3:
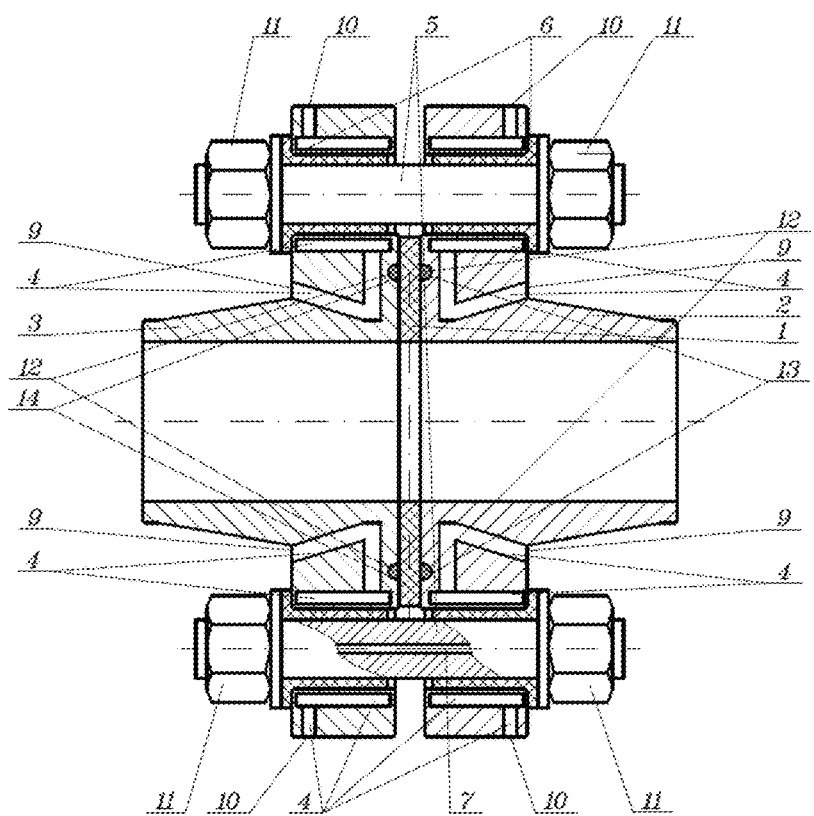
FIG. 3 illustrates a cross-sectional view of another exemplary flange assembly according to embodiments of the present invention wherein interface surfaces of the assemblies each include a notch or indentation into which an O-ring or gasket is placed for providing pressure sealing of the working fluid.
Figure 4:
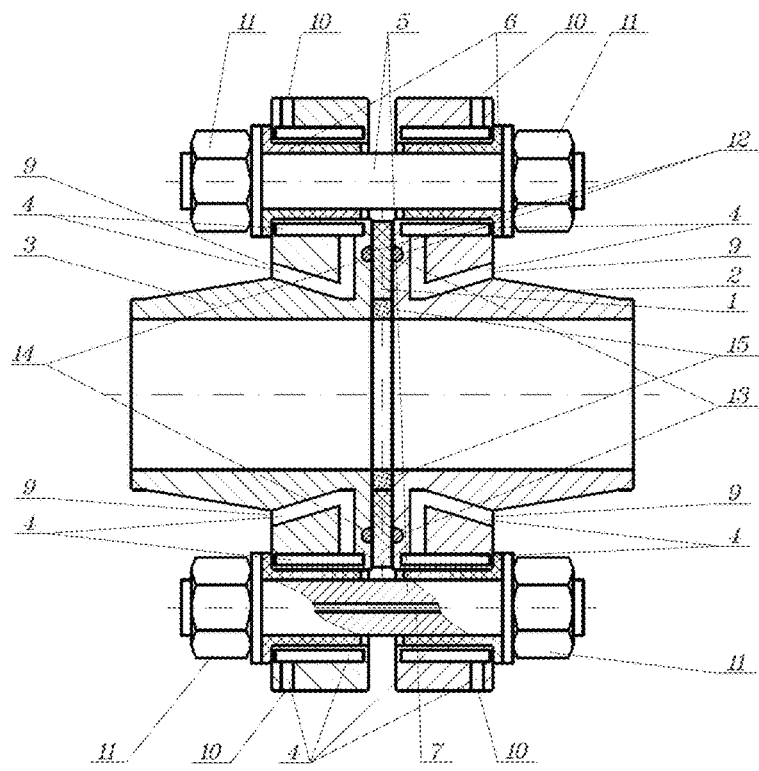
FIG. 4 illustrates a cross-sectional view of another exemplary flange assembly according to embodiments of the present invention wherein interface surfaces of the assemblies each include a notch or indentation into which an O-ring or gasket is placed for providing pressure sealing of the working fluid and a protective element gasket in contact with the working fluid.

FIG. 3 shows a diagram of a flange connection with a dielectric separator between the flanges and elastomeric rings of the O-ring type. FIG. 4 shows a diagram of a flange connection with a dielectric separator between the flanges, elastomeric rings of the O-ring type and a sealing-protective element.

Figure 5A:
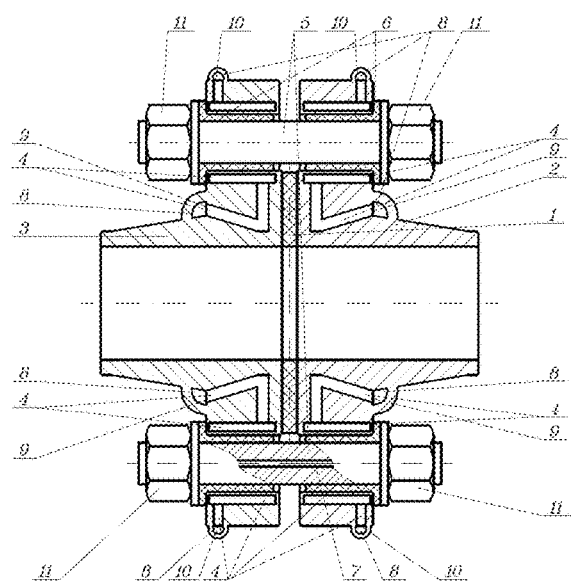
FIG. 5A illustrates a cross-sectional cutaway view of a flange assembly according to embodiments of the present invention where the assembly includes with flange structures with channels held together by fasteners composed of washers, nuts and bolts having heat transfer material channels.
Figure 5B:
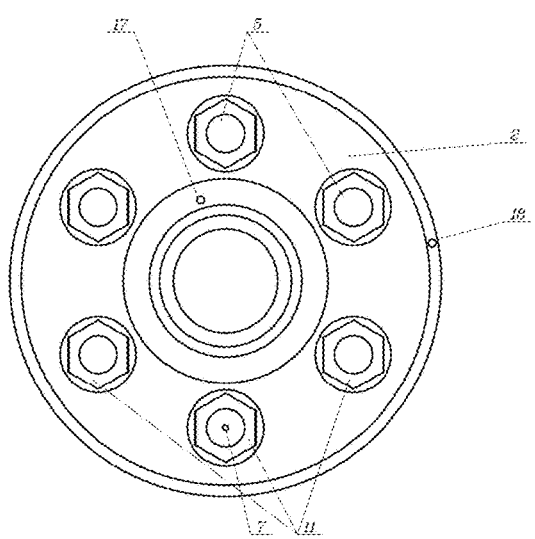
FIG. 5B is a side view of the flange assembly of FIG. 5A, wherein inlets and outlets of the channels can be seen in the bolts and in the flange structure.
Figure 6:
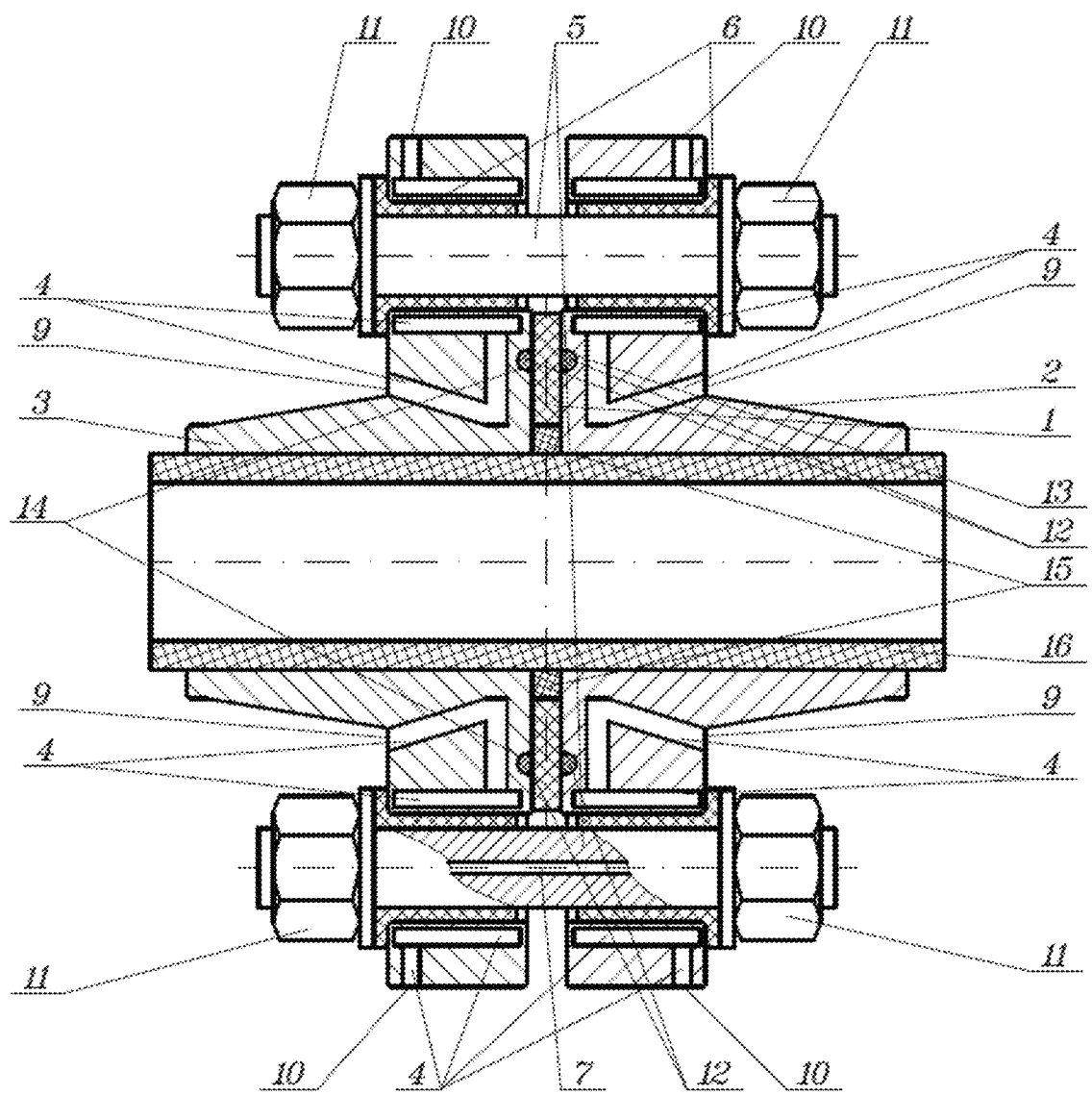
FIG. 6 illustrates a cross sectional cutaway view of a slightly different exemplary embodiments of a flange assembly according to embodiments of the present invention.

FIG. 5A shows a diagram of a flange assembly/connection with a dielectric seal between the flanges and with annular channels acting as input and output collectors for other channels. FIG. 6 shows a diagram of a flange connection with a dielectric separator between the flanges, elastomeric O-ring rings and a sealing and protective element and an insulating layer and between the working fluid and the pipeline with the continuation of this insulating layer in the flange connection. FIG. 5B is a side view of the flange assembly/connection of FIG. 5A.

Flange connection with a dielectric seal 1 between flanges 2 and 3, which are made with channels 4, with fasteners 5. The sealing surfaces of flanges 2 and 3, which can be made of one of many types and shapes widely used in the industry: flat, with a protrusion and a depression, with a spike and a groove, for laying oval section, for the lens gasket and other coupling options with the provision of an insulating gap between flanges 2 and 3 and the corresponding configuration of the dielectric seal 1. Insulators 6 are used to provide electrical insulation between flanges 2 and 3 and fasteners 5.

The fastening element 5 can be made with a channel 7. Channels 4 and 7 can be made of sections of different curvature with different shape and cross-sectional area connected in series and/or in parallel. The channels may be made inside the material of flange 2 and 3 and/or fastener 5. Channels may also be formed outside the material of flange 2 and 3 and/or fastener 5. Channels 4 and 7 can be made of sections of different curvature and shape with different cross-sections with serial or parallel connection.

In the embodiment, in which part of the channels 8 acts as collectors for other channels 4, the supply of coolant to channels 4 and the reception of coolant from channels 4 is carried out by means of channels 8 connected to the flange housing in the areas of inlet 9 and/or outlet 10 holes of channels 4 of flanges 2 and 3.

In the embodiment, in which the coolant is supplied to channels 4 and 7 and the coolant is received from channels 4 and 7 through tubes (not shown in the figures) attached to the flange housing in the areas of inlet 9 and/or outlet 10 holes of channels 4 of flanges 2 and 3 and channels 7 of fasteners 5 (for channels 7 the figures are not shown). the appointment of holes 9 as input and 10 as output is conditional. When the coolant flow is reversed, the holes 9 become the outlet, and the holes 10 become the inlet.

Fasteners 5 can be made in the form of studs and/or bolts tightened by nuts 11.

Liquid or gas or supercritical fluid can be used as a heat transfer material or coolant.

The dielectric seal 1 can be made in the form of an integral annular gasket of various cross-sections, performing both the function of a dielectric separator and the function of a seal.

The dielectric seal 1 may contain at least two elastomeric rings 12 located on both sides of the annular gasket 1 in grooves 13 and 14 made in flanges 2 and 3 and/or in the annular gasket 1 (variants of grooves in the annular gasket 1 are not shown in the figures). sealing and protective element 15.

There may be an insulating layer 16 between the working fluid and the pipeline with the continuation of this insulating layer 16 in the flange connection.

As a material for flanges 2 and 3 and/or fasteners 5, a metal or alloy with a relative magnetic permeability of no more than 10 (ten) can be used.

The exemplary flange connections of FIGS. 2 to 6 may function as follows: Flanges 2 and 3 are connected through a dielectric seal 1 with fasteners 5. A thermostabilizing coolant is constantly supplied to channels 4 (7), or if necessary. The flange connection is used for its intended purpose, facilitating the transfer of working fluid.

Figure 7:
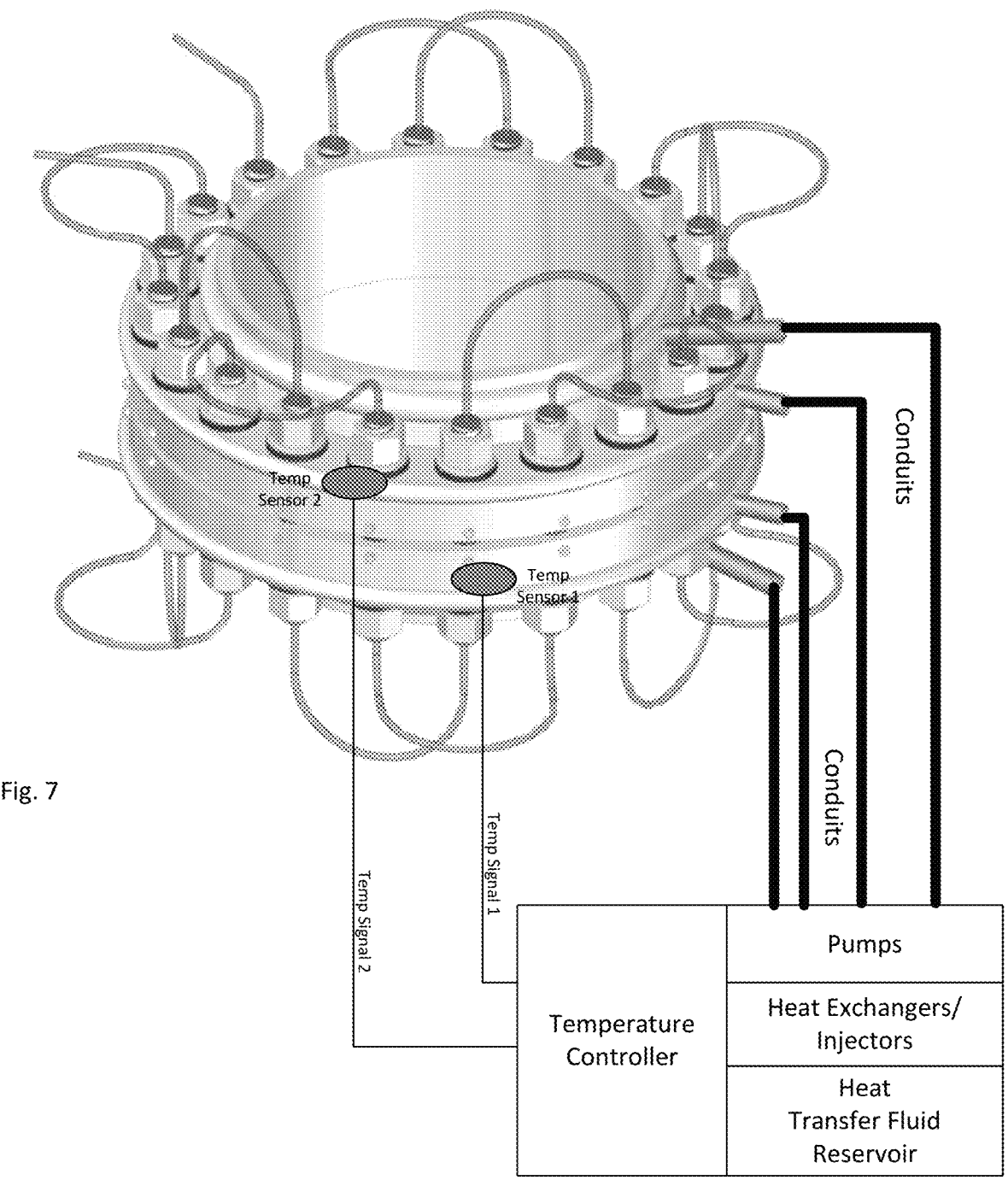
FIG. 7 is an illustration of the exemplary flange assembly rendering of FIG. 1A interconnected with a functional block diagram of a temperature controller which receives signals from temperature sensors on the assembly and regulates temperature and flowrates of heat transferring material circulated through channels in the assembly.

FIG. 7 is an illustration composed of the exemplary flange assembly rendering of FIG. 1A interconnected with a functional block diagram of a temperature controller which receives signals from temperature sensors on the assembly and regulates temperature and flowrates of heat transferring material circulated through channels in the assembly. The temperature controller regulates heat transfer pumps, valves and heat exchangers in order to supply heat transfer material to the inlets of the flange structures at target rates and target temperatures selected by algorithms described therein.

With reference to common feature or element numbering across multiple figures, the heat transfer material (e.g. coolant) is supplied from the outside into channels 4 and 7 and the material is received from channels 4 and 7 when the material passes from the body of the flange and fasteners, respectively, is carried out through tubes (not shown in the figures) connected to the flange housing in the areas of input 9 and/or output 10 holes of channels 4 of flanges 2 and 3 and channels 7 of fasteners 5 (for channels 7 are not shown in the figures)."

Embodiment of the flange assembly where the heat transfer material enters channels 8, which acts as collectors for channels 4, from the outside enters through the hole 17, the material passes through channels 8 and 4, and is removed through the hole 18. Holes 17 and 18 can be in different versions, not one at a time, but several.

Embodiments of flange assemblies and or connections according to embodiments of the present invention may be characterized in that the dielectric seal is made in the form of a one-piece annular gasket of various cross-sections, performing both the function of a dielectric separator and the function of a seal.

Flange assemblies and or connections according to some embodiments of the present invention may be characterized in that the isolation material isolating one flange interface surface from there may also act as a sealing material, optionally a dielectric, which fills in and seals possible gaps between interrace or contact surfaces of the respective flange structures. This isolation sealing material may be made as a composite. Part of the composite may be made of a material or materials having or, respectively, having sufficient rigidity and strength, high electrical resistance, high breakdown voltage to provide an insulating gap ensuring the absence of electrical connection between the flange structures when tightening the flange connection with fasteners. One or more other constituents of the composite material may be made or, respectively, composed of a material or materials that perform or, respectively, perform the function of filling in and sealing any space between the assembly's flange structures so as to ensure working fluid in the pipes and passing across the flange assembly connection does not leak out of any gaps between the interface surfaces of respective flange structures. The composite isolation material may also include an additive to provide the constituent materials protection from the effects of harmful factors within the working fluid and/or an insulating layer.

According to further embodiments, a liner or insulation material may be used to insulate and protect the inner surfaces of the each of the respective pipes connected to each of the flange structures. The insulating liner of the pipes may protect the inner surface of the pipes chemically or thermally. The insulating layer, shown in the figure as element 16, between the working fluid and the pipeline may extend from the inner surface of its respective pipes onto the interface surface of the pipe's respective flange, thereby insulating the interface surfaces of the flange connection. This insulating layer liner may provide a heat gradient between the working fluid and the inner surface of lined pipe. According to further embodiments, the insulating layer may extend into the gap between the interface surfaces where the isolation material is added as a, optionally as a gasket in between the interface surfaces of the two flange structures.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A flange assembly for forming an interconnection between pipes which pipes carry a working fluid the interconnection, said flange assembly comprising:
    first and second flange structures fastened to one another along respective flange structure interface surfaces and in alignment of respective flange structure pipe openings, wherein each of said flange structures includes a body portion with at least one heat transfer material channel disposed upon or within said body portion such that heat transfer material within said heat transfer channels influences a temperature of the body portion of each of the flange structures;
    an isolation material disposed between interface surfaces of the first and second flange structures, thereby isolating the first and second flanges structures from one another according to one or more of the following: (1) thermally, (2) electrically, and (3) chemically; and
    wherein said heat transfer material channels and heat transfer material are thermally configured to maintain an operative temperature range in the isolation material between the two flange structures while the working fluid passing through the pipes interconnected by said assembly is at a temperature outside the operative temperature range of the isolation material.

2. The flange assembly according to claim 1, further comprising the isolation material disposed upon respective fastener engagement features of the first and second flange structures, which fastener engagement features are configured to be physically engaged by a fastening element while keeping the fastening element electrically isolated from each of the flange structures.

3. The flange assembly according to claim 2, wherein the isolation material is comprised of a dielectric material.

4. The flange assembly according to claim 2, further comprising at least one fastener to fasten said first and second flange structures to one another by engaging electrical isolation material covered fastener features on each of said first and second flange structures.

5. The flange assembly according to claim 4, wherein said at least one fastener also includes a heat transfer material channel, and each of the channels of said flange assembly carries heat transfer material which either cools or heats the assembly element through which the heat transfer material is carried.

6. The flange assembly according to claim 4, wherein heat transfer material is supplied to an inlet, or carried away from an outlet, of at least one channel, using conduits placed separately from the flange structures and the at least one fastener and attached to the body of the flange structures and/or the at least one fastener in the areas of the inlet or the outlet of the channel.

7. The flange assembly according to claim 4, wherein said at least one fastener is comprised of studs and/or bolts tightened with nuts.

8. The flange assembly according to claim 4, wherein a material of the flange structures and/or the at least one fastener is metal or metal alloy with a relative magnetic permeability of no more than 10.

9. The flange assembly according to claim 1, wherein at least one flange structure is functionally associated with an electrically readable temperature sensor which generates an electrical signal indicating an estimated temperature of the at least one flange structure.

10. The flange assembly according to claim 9, further comprising a working fluid temperature sensor thermally coupled with the pipes and configured to generate an electrical signal indicating an estimated temperature of the working fluid flowing through the pipes.

11. The flange assembly according to claim 10, further comprising a temperature controller to regulate a temperature and flowrate of heat transfer material pumped into a given channel associated with a given flange structure, wherein the heat transfer material temperature and flowrate are at least partially calculated based on electrical signals generated by the temperature sensor thermally coupled to the working fluid through the pipes.

12. The flange assembly according to claim 11, wherein said temperature controller is further configured to set a heat transfer material temperature and flowrate at least partially based on electrical signals generated by said working fluid temperature sensor.

13. The flange assembly according to claim 11, wherein a temperature and flowrate for each flange of said flange assembly is individually regulated.

14. The flange assembly according to claim 1, wherein at least one channel of a flange structure is either an aggregation channel or a distribution channel for two or more other channels of the flange structure.

15. The flange assembly according to claim 14, wherein aggregation channels and distribution channels have different structural configurations from the heat transfer channels with which the channels connect.

16. The flange assembly according to claim 1, wherein the heat transfer material is a liquid or gas or supercritical fluid used as a coolant.

17. The flange assembly according to claim 1, wherein said isolation material also acts as a working fluid seal inhibiting working fluid flowing passing from a first pipe of a first flange structure into a second pipe of a second flange structure from leaking out the sides of the interface of the first and second flange interface surfaces, wherein the isolation material seal is made as a composite, part of which is made of a material or materials having or, respectively, having rigidity and strength, high electrical resistance, and high breakdown voltage to provide an insulating gap ensuring the absence of electrical connection between the flanges when tightening the flange assembly with fasteners, and the other part or the parts are made or, respectively, made of a material or materials that perform or, respectively, perform the function of sealing and, a third part or parts that perform or, respectively, perform a function of protection from the effects of harmful factors from the working fluid and/or an insulating layer which may be located between the working fluid and the material of the flange assembly to protect the material of the flange assembly from a harmful effect of the working fluid.

18. The flange assembly according to claim 17, wherein said isolation material in between the two interface surfaces is in the form of an annular gasket functioning as: (a) an electrical isolator; (b) a working fluid seal; or (c) both.

19. The flange assembly according to claim 1, wherein the electrical isolation material is a composite of material exhibiting characteristics including: (1) mechanical strength, (2) high electrical resistance, (3) high breakdown voltage, (4) high chemically unreactive, and (5) rigidity.

* * * * *